United States Patent
Raffer et al.

(10) Patent No.: US 11,205,074 B2
(45) Date of Patent: Dec. 21, 2021

(54) METHOD AND DEVICE FOR DETECTING AN OBSTACLE-FREE AREA

(71) Applicant: TEC-INNOVATION GMBH, Hautzendorf (AT)

(72) Inventors: Markus Raffer, St. Andrae (AT); Kevin Pajestka, Hautzendorf (AT); Friedrich Fraundorfer, Graz (AT); David Schinagl, Graz (AT)

(73) Assignee: Tec-Innovation GmbH, Hautzendorf (AT)

( * ) Notice: Subject to any disclaimer, the term of this patent is extended or adjusted under 35 U.S.C. 154(b) by 0 days.

(21) Appl. No.: 16/651,216

(22) PCT Filed: Sep. 24, 2018

(86) PCT No.: PCT/AT2018/060223
§ 371 (c)(1),
(2) Date: Mar. 26, 2020

(87) PCT Pub. No.: WO2019/060936
PCT Pub. Date: Apr. 4, 2019

(65) Prior Publication Data
US 2020/0293776 A1    Sep. 17, 2020

(30) Foreign Application Priority Data
Sep. 26, 2017   (AT) .............................. A 50823/2017

(51) Int. Cl.
*G06K 9/00* (2006.01)
*G06T 7/13* (2017.01)
(Continued)

(52) U.S. Cl.
CPC ......... *G06K 9/00664* (2013.01); *G01C 21/30* (2013.01); *G06K 9/00805* (2013.01);
(Continued)

(58) Field of Classification Search
CPC .. G06K 9/00664; G06K 9/00805; G06T 7/13; G06T 7/90; G06T 2207/20081;
(Continued)

(56) References Cited

U.S. PATENT DOCUMENTS

| 10,395,486 | B2 | 8/2019 | Pajestka et al. | |
| 2015/0356837 | A1* | 12/2015 | Pajestka | G08B 3/10 340/4.14 |
| 2016/0247290 | A1 | 8/2016 | Liu et al. | |

FOREIGN PATENT DOCUMENTS

| KR | 20100127007 A | 12/2010 |
| WO | 2014107754 A2 | 7/2014 |

OTHER PUBLICATIONS

Machine translation for KR20100127007, IDS (Year: 2010).*
(Continued)

*Primary Examiner* — Qian Yang
(74) *Attorney, Agent, or Firm* — Laurence A. Greenberg; Werner H. Stemer; Ralph E. Locher

(57) ABSTRACT

A method detects the image of an obstacle-free region surrounding a photograph-capturing unit. A photograph of a portion of the environment of the photograph-capturing unit is created by the photograph-capturing unit and a digital picture is created. The digital picture is examined for the presence of possible boundaries of an obstacle-free region, a boundary indicator value being determined for each individual pixel of the digital picture in accordance with the picture data of the digital picture within an environment of the pixel in question. The picture data being defined pixel by pixel, the boundary indicator value indicating the probability that the image of the boundary of an obstacle-free region is located within a specified pixel environment. A coordinate parameterization having two parameters is specified for the (Continued)

digital picture, which coordinate parameterization corresponds in particular to the pixel coordinates.

27 Claims, 7 Drawing Sheets

(51) Int. Cl.
*G06T 7/90* (2017.01)
*G01C 21/30* (2006.01)

(52) U.S. Cl.
CPC ............... *G06T 7/13* (2017.01); *G06T 7/90* (2017.01); *G06T 2207/20081* (2013.01); *G06T 2207/20084* (2013.01)

(58) Field of Classification Search
CPC .......... G06T 2207/20084; G06T 9/002; G01C 21/30; G01C 21/3652; G09B 21/003; A61H 3/061; A61F 9/08
See application file for complete search history.

(56) References Cited

OTHER PUBLICATIONS

Anonymous, "Imaging technique acquires a color image and depth map from a single monocular camera image", (Jun. 8, 2016), URL: https://phys.org/news/2016-06-imaging-technique-image-depth-monocular.html, (Jan. 2, 2019), XP055537934.
Anonymous, "Canny edge detector", May 23, 2017 (May 23, 2017), URL: https://en.wikipedia.org/w/index.php?title=Canny_edge_detector&oldid=781894189 [retrieved May 8, 2021], XP055830287.

\* cited by examiner

METHOD AND DEVICE FOR DETECTING AN OBSTACLE-FREE AREA

BACKGROUND OF THE INVENTION

Field of the Invention

The invention relates to a method and to a device for detecting the map of an obstacle-free area surrounding an image acquisition unit according to the preambles of the independent claims.

Orientation aids, such as tactile floor guidance systems in urban areas, are known from the prior art, based on which visually impaired persons are able to independently orient themselves and move, for example with the aid of a white cane or long cane. The disadvantage of such orientation aids, however, is that these are almost absent in rural areas and that these are difficult or impossible to use for persons who have limited motor skills.

Furthermore, a device for detecting an environment is known from AT 513881 A2, which can also be used in rural areas or outdoors by persons who are visually impaired and have limited motor skills. The device can be incorporated in a shoe or a white cane or long cane, for example, and ascertains a distance from a potential obstacle by way of a distance sensor. A warning is transmitted to the user via a feedback unit as a function of the ascertained distance.

The disadvantage of the known device, however, is that only a single distance value is provided, which establishes how far an object is located from the pick-up unit, wherein the distance measurement is only carried out along a single direction, proceeding from the pick-up unit.

SUMMARY OF THE INVENTION

It is therefore the object of the invention to improve the device known from the prior art for distance detection, and to provide a method that ensures that persons who are visually impaired and have limited motor skills can move safely in any environment. In particular, it is also an object of the invention to provide directionally dependent pieces of distance information, which indicate a respective distance for a plurality of directions, in particular for each image column of the digital image, the distance being related to the direction.

The invention achieves this object in a method of the type mentioned at the outset, wherein
a) at least one image of a portion of the environment of the image acquisition unit is created by way of the image acquisition unit, and a digital image is created based on this at least one image. According to the invention, it is provided
b) that the digital image thus created is examined for the presence of possible boundaries of an obstacle-free area, wherein, as a function of the pixel-wise predefined image data of the digital image within an environment of the particular pixel, a respective boundary indicator value is ascertained for individual pixels of the digital image which indicates the probability with which the map of the boundary of an obstacle-free area is located within a predefined pixel environment;
c) that a coordinate parameterization having two parameters, which corresponds in particular to the pixel coordinates, is predefined for the digital image;
d) that a bounding curve of the obstacle-free area, in particular in the form of a polygonal chain, is ascertained as a curve on which image points are located that, compared to image points in the environment thereof, have a high boundary indicator value; and
e) that the map of the obstacle-free area is established by the bounding curve and, if necessary, by further previously predefined curves or straight lines, in particular the bounding edges of the digital image.

So as to provide a particularly reliable map of the obstacle-free area surrounding the image acquisition unit, it may be provided that a polygonal chain that extends through a number of pixels of the digital image is selected as the bounding curve, wherein a respective image point, in particular a pixel, through which the polygonal chain extends is selected for a number of predefined first parameters, and in particular for each image column of the digital image or for a number of image columns having a respective predefined x coordinate.

So as to ascertain the bounding curve particularly reliably, it may be provided that, for the ascertainment of the bounding curve, an optimization method is carried out in step d), in which, for individual bounding curves being considered, a respective measure value to be optimized is ascertained for individual image points on the respective bounding curve, in particular for a plurality of image points, each having predefined first parameters or x coordinates, the measure value being composed of the following partial measure values:
  the boundary indicator value; and
  the value of the second parameter, in particular of the y coordinate, or a value derived therefrom; and/or
  the difference between the second parameter in the particular point and the second parameter in a neighboring point located on the same bounding curve, the first parameter of which deviates by a predefined value, and which in particular is located in a neighboring column of the digital image, or a value derived from this difference.

So as to ascertain a particularly smooth bounding curve, which preferably extends close to the ground, so that, for example, window edges extending vertically away from the ground are ignored in the ascertainment of the bounding curve, it may be provided that, for the ascertainment of the bounding curve, an optimization method is carried out in step d), in which, for individual bounding curves being considered, in each case those image points on the particular bounding curve, in particular for a plurality of image points, each having predefined first parameters or x coordinates, are selected which
  compared to other image points, in particular having the same predefined first parameter or the same x coordinate, have preferably high boundary indicator values; and/or
  have preferably high values of the second parameter, in particular of the y coordinate; and/or
  have a second parameter, in particular a y coordinate, which approximately corresponds to the second parameter of the particular neighboring point on the bounding curve, or has only a small difference compared to this second parameter, in particular so that a bounding curve results from the position of the image points whose change in the direction of the second parameter, in particular of the y coordinate, is preferably small.

A high accuracy and reliability in the identification of a boundary of an obstacle-free area can be achieved when the boundary indicator value is calculated in a pixel-wise manner by way of a neural network, in particular in the same manner for all pixels and independently of the remaining pixels, wherein the neural network receives, as input values, the individual brightness or color values within an environment around the particular pixel, which is in particular identically predefined for each pixel, in particular having a predefined relative position with respect to the particular pixel.

So as to provide effective training for neural networks, so that these supply precise boundary indicator values, it may be provided that the neural network is created using a plurality of predefined training images, wherein a respective training bounding curve is predefined for each of the training images, and the neural network is trained to supply a boundary indicator value, which deviates from the boundary indicator values ascertained in the remaining image area, for the particular training image in the image points located in the area of the training bounding curve.

Another advantage of the invention is that, in contrast to methods known from the prior art, it is only manually established within the scope of the training where the delimitations of the walkable area are located, or not. As a result, the annotation complexity is considerably less than with known methods that, together with the pixels, store additional pieces of information, such as that a pixel representing a portion of a window or a wall, for example, is involved.

So as to ensure that a user of the method is able to move particularly safely, it may be provided that the actual size and shape of the mapped obstacle-free area within the environment of the image acquisition unit is ascertained
- based on the position of the obstacle-free area in the digital image;
- based on the relative position, in particular the height and the orientation, of the image acquisition unit compared to the environment;
- if necessary, parameters of the image acquisition unit, in particular the resolution and the focal length; and
- assuming that the obstacle-free area picked up in the digital image is located on a predefined three-dimensional surface, in particular on a plane.

So as to ensure that a method according to the invention can be used flexibly especially by persons who are visually impaired and have limited motor skills, it may be provided that the at least one image is acquired by an image acquisition unit that is fixedly mounted on a person or on an animal, and in particular arranged in a shoe, a glove, a belt, a helmet, a walking cane or a walking aid.

So as not to carry out a method according to the invention continuously, but only in a targeted manner under predefined conditions, so that, for example, an image acquisition unit required for carrying out the method does not have to be supplied with power permanently, it may be provided that the position and the orientation of the image acquisition unit are monitored, and the image acquisition unit only creates images or carries out steps b) to e)
- when the image acquisition unit is in a predefined position, in which both the orientation of the horizontal image axis of the image acquisition unit and the viewing direction of the image acquisition unit are oriented approximately horizontally, in particular at an angular deviation of no more than 30° about a horizontal axis, or
- when the shoe containing the image acquisition unit is placed completely on the ground.

So as to start the sequence of a method according to the invention in a targeted manner, it may be advantageous that the digital images are acquired by an image acquisition unit mounted in a shoe, wherein the height of the image acquisition unit above the ground is ascertained when the shoe is on the ground; and the actual size and shape of the mapped obstacle-free area is determined according to the invention under the prerequisite that the image acquisition unit is located at the ascertained height.

Particularly safe movement can be made possible for persons who are visually impaired and have limited motor skills when, in step b), in addition to the boundary indicator value, an obstacle indicator is also ascertained, which indicates the type of obstacle bounding the obstacle-free area; and when the respective obstacle indicator is ascertained for individual image points on the bounding curve, and preferably is displayed to the person.

So as to easily and precisely provide a distance from the boundary of the obstacle-free area for a user of a method according to the invention, it may be provided that a first distance of the bounding curve, or of at least one point on the bounding curve of the obstacle-free area, from the image acquisition unit is ascertained,
- that, in addition to the acquisition of the digital image, a second distance is determined by distance measurement using ultrasound, wherein an ultrasonic sensor used for this purpose is arranged in the area of the image acquisition unit and
  - is oriented in the same direction as the image acquisition unit, or
  - has a detection area that partially overlaps with the acquisition area of the image acquisition unit;
- that the second distance and the first distance of the obstacle-free area are compared to one another, and a further distance measurement value is created, using the first distance and the second distance, wherein in each case the respective lower distance is preferably regarded as the further distance measurement value in the event of deviations.

The invention furthermore relates to a method that ensures that a person who is visually impaired and has limited motor skills is able to move independently in an environment since the person is warned about obstacles. According to the invention, it is provided that a distance value, corresponding to the size of the obstacle-free area, around a person is ascertained or predefined, and thereafter at least one of multiple actuator elements, in particular vibration elements, which are arranged sequentially in the direction of the more sensitive body region, and in particular toward the tip of the foot, is activated in at least one location of the body, in particular in at least one shoe, of the person, as a function of this distance value, wherein the actuator elements are selected as a function of the distance value, and wherein an actuator element in a more sensitive body region, in particular closer to the tip of the foot, is selected the smaller the distance value The invention furthermore relates to a device for detecting the map of an obstacle-free area surrounding an image acquisition unit, comprising an image acquisition unit and a processing unit connected downstream of the image acquisition unit. According to the invention, it is provided that the image acquisition unit is designed to create at least one image of a portion of the environment of the image acquisition unit and to transmit the image to the processing unit, and that the processing unit is designed
- to create a digital image based on this at least one image, and to examine the digital image thus created for the presence of possible boundaries of an obstacle-free area;
- to ascertain a respective boundary indicator value for individual pixels of the digital image, as a function of the pixel-wise predefined image data of the digital image within an environment of the particular pixel, which indicates the probability with which the map of the boundary of an obstacle-free area is located within a predefined pixel environment;

to predefine a coordinate parameterization having two parameters, which corresponds in particular to the pixel coordinates, for the digital image;

to ascertain a bounding curve of the obstacle-free area, in particular in the form of a polygonal chain, as a curve on which image points are located that, compared to image points in the environment thereof, have a high boundary indicator value; and to establish the map of the obstacle-free area by the bounding curve and, if necessary, by further previously predefined curves or straight lines, in particular the bounding edges of the digital image.

So as to ascertain a reliable map of the obstacle-free area surrounding the image acquisition unit, it may be provided that the processing unit is designed to select a polygonal chain as the bounding curve, wherein the polygonal chain extends through a number of pixels of the digital image; and to select a respective image point, in particular a pixel, through which the polygonal chain extends, for a number of predefined first parameters, and in particular for each image column of the digital image or for a number of image columns having a respective predefined x coordinate.

So as to ascertain the bounding curve particularly reliably, it may be provided in one embodiment of the invention that the processing unit is designed to carry out an optimization method for the ascertainment of the bounding curve, wherein the processing unit is designed to ascertain, for individual bounding curves being considered, a respective measure value to be optimized for individual image points on the respective bounding curve, in particular for a plurality of image points, each having predefined first parameters or x coordinates, wherein the measure value is composed of the following partial measure values:

the boundary indicator value; and the value of the second parameter, in particular of the y coordinate, or a value derived therefrom; and/or the difference between the second parameter in the particular point and the second parameter in a neighboring point located on the same bounding curve, the first parameter of which deviates by a predefined value, and which in particular is located in a neighboring column of the digital image, or a value derived from this difference.

So as to ensure a smooth course of the bounding curve, preferably close to the ground, in which edges extending vertically away from the ground remain without consideration, it may be provided that the processing unit is designed, for the ascertainment of the bounding curve, to carry out an optimization method, wherein the processing unit is designed, for individual bounding curves being considered, to select in each case those image points on the particular bounding curve, in particular for a plurality of image points, each having predefined first parameters or x coordinates, which compared to other image points, in particular having the same predefined first parameter or the same x coordinate, have preferably high boundary indicator values and/or preferably high values of the second parameter, in particular of the y coordinate; and/or have a second parameter, in particular a y coordinate, which approximately corresponds to the second parameter of the particular neighboring point on the bounding curve, or has only a small difference compared to this second parameter, so that, in particular, a bounding curve results from the position of the image points whose change in the direction of the second parameter, in particular of the y coordinate, is preferably small.

So as to achieve high accuracy and reliability in the identification of a boundary of an obstacle-free area, it may be provided that the processing unit is designed to calculate the boundary indicator value in a pixel-wise manner by way of a neural network, in particular in the same manner for all pixels and independently of the remaining pixels; and to provide the neural network, as input values, with the individual brightness or color values within an environment around the particular pixel, which is in particular identically predefined for each pixel, in particular having a predefined relative position with respect to the particular pixel.

So as to effectively train the neural networks so that these supply precise boundary indicator values, it may be provided that the processing unit is designed to create the neural network using a plurality of predefined training images; and to predefine a respective training bounding curve for each of the training images, and to train the neural network to supply a boundary indicator value, which deviates from the boundary indicator values ascertained in the remaining image area, for the particular training image in the image points located in the area of the training bounding curve.

So as to ensure that a user of a device according to the invention is able to move safely in an environment unknown to the user, it may be provided that the processing unit is designed to ascertain the actual size and shape of the mapped obstacle-free area within the environment of the image acquisition unit based on the position of the obstacle-free area in the digital image;

based on the relative position, in particular the height and the orientation, of the image acquisition unit compared to the environment;

if necessary, parameters of the image acquisition unit, in particular the resolution and the focal length; and assuming that the obstacle-free area picked up in the digital image is located on a predefined three-dimensional surface, in particular on a plane.

So as to ensure that a person who is visually impaired and has limited motor skills is able to carry a device according to the invention in a variety of ways, it may be provided that the image acquisition unit is fixedly mounted on a person or on an animal, and in particular arranged in a shoe, a glove, a belt, a helmet, a walking cane or a walking aid.

In a particularly energy-saving embodiment of the invention, in which, for example, the image acquisition unit does not have to be permanently supplied with power, it may be provided that the processing unit is designed to monitor the position and the orientation of the image acquisition unit, and to carry out further processing steps, only when the image acquisition unit is in a predefined position in which both the orientation of the horizontal image axis of the image acquisition unit and the viewing direction of the image acquisition unit are oriented approximately horizontally, in particular at an angular deviation of no more than 30° about a horizontal axis, or when the shoe containing the image acquisition unit is placed completely on the ground and/or that the image acquisition unit is designed to create images only when the image acquisition unit is in a predefined position in which both the orientation of the horizontal image axis of the image acquisition unit and the viewing direction of the image acquisition unit are oriented approximately horizontally, in particular at an angular deviation of no more than 30° about a horizontal axis, or when the shoe containing the image acquisition unit is placed completely on the ground.

So as to start the acquisition of digital images in a targeted manner and to ascertain parameters by way of the image acquisition unit, it may be provided that the image acquisition unit is mounted in a shoe, wherein the processing unit is designed to ascertain the height of the image acquisition unit above the ground when the shoe is on the ground; and to determine the actual size and shape of the mapped obstacle-free area under the prerequisite that the image acquisition unit is located at the ascertained height.

So as to allow persons who are visually impaired and have limited motor skills to move particularly safely in an environment that is foreign to them, it may be provided that the processing unit is designed to also ascertain, in addition to the boundary indicator value, an obstacle indicator, which indicates the type of obstacle bounding the obstacle-free area; and to ascertain the respective obstacle indicator for individual image points on the bounding curve.

So as to easily and precisely provide a distance from the boundary of the obstacle-free area for a user, it may be provided that a device according to the invention comprises an ultrasonic sensor that is arranged in the region of the image acquisition unit, wherein the ultrasonic sensor is oriented in the same direction as the image acquisition unit, or has a detection area that partially overlaps with the acquisition area of the image acquisition unit;

characterized in that the processing unit is designed to ascertain a first distance of the bounding curve or of at least one point on the bounding curve of the obstacle-free area from the image acquisition unit;

in addition to the acquisition of the digital image, to determine a second distance by distance measurement using the ultrasonic sensor; and to compare the second distance and the first distance of the obstacle-free area to one another, and to create a further distance measurement value, using the first distance and the second distance; and to preferably establish in each case the respective lower distance as the further distance measurement value in the event of deviations.

So as to display the ascertained parameters to a user while moving in an environment unknown to the user, it may be provided that a device according to the invention comprises a feedback unit, wherein the feedback unit is designed to communicate, in particular wirelessly, data to the processing unit and to display the ascertained distance measurement value and/or the ascertained obstacle indicator value and/or the actual size and shape of the mapped obstacle-free area to the person.

The invention furthermore relates to a device that allows a person who is visually impaired and has limited motor skills to move independently in an unknown environment since the device warns the person about obstacles. According to the invention, it is provided that the feedback unit is designed as a shoe comprising actuator elements, and that the processing unit is designed to ascertain or predefine a distance value, corresponding to the size of the obstacle-free area, around a person; and to activate the feedback unit as a function of this distance value;

to activate, in the shoe of the person, at least one of multiple actuator elements, in particular vibration elements, which are arranged sequentially in the direction of the more sensitive body region, and in particular toward the tip of the foot, to select the actuator elements as a function of the distance value, and to select an actuator element in a more sensitive body region, in particular closer to the tip of the foot, the smaller the distance value.

Further advantages and embodiments of the invention will be apparent from the description and the accompanying drawings.

Exemplary embodiments of the invention are schematically illustrated in the drawings and will be described hereafter by way of example with reference to the drawings.

DETAILED DESCRIPTION OF THE INVENTION

Figure 1:
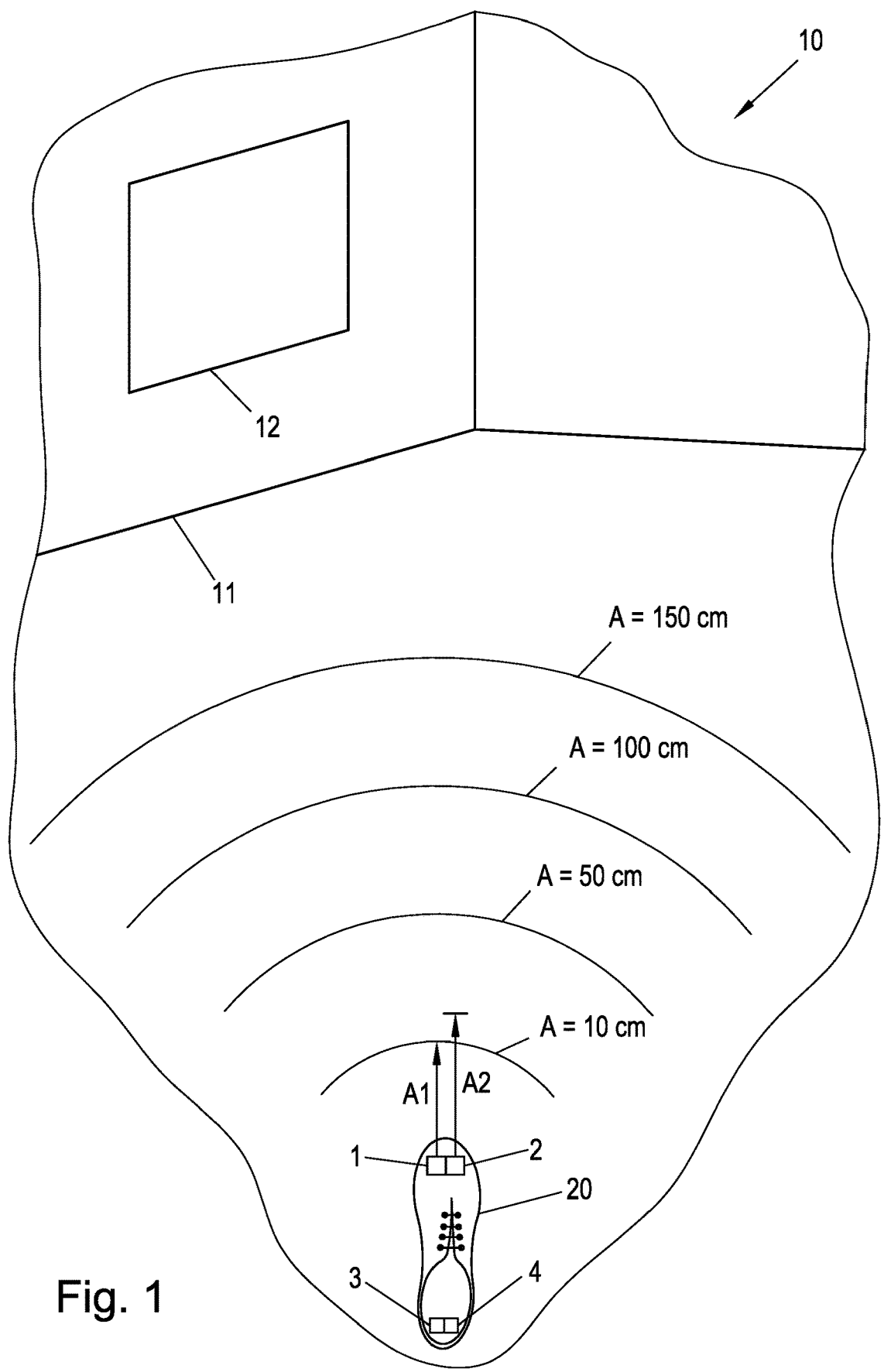
FIG. 1 shows an environment around an image acquisition unit.

FIG. 1 shows an environment 10 in the form of a room in which a visually impaired person would like to move. A window is arranged in one of the walls delimiting the room, wherein the window has a lower window edge 12. Since the room is not known to the person, the person is dependent on aids that warn about obstacles, such as two walls located in the direction of movement of the person, and, for example, identify the walkable, obstacle-free area.

The person is thus wearing an aid, such as a shoe 20 in which an image acquisition unit 1 is arranged. The image acquisition unit 1 mounted in the shoe 20 is a waterproof, robust camera, is it is frequently used on the field of sports, for example. Such cameras are small enough to have room in a shoe 20. In the exemplary embodiment shown in FIG. 1, the image acquisition unit 1 is arranged at the tip of the shoe in the region of the toes of the wearer of the shoe 20 and is oriented in the direction of movement of the wearer of the shoe 20.

In the exemplary embodiment shown in FIG. 1, a processing unit 4, an energy store 3 and an ultrasonic sensor 2 are arranged in the shoe 20, in addition to the image acquisition unit 1. The image acquisition unit 1 is designed to provide images in the form of digital images, and to forward digital images D created by it to the processing unit 4. The processing unit 4 is designed to process the digital images D transmitted to it, and to carry out the method steps according to the invention described in more detail hereafter.

It is also possible, of course, for multiple ultrasonic sensors 2 to be arranged in the shoe 20. Other devices that are needed to carry out a method according to the invention or to transmit the ascertained obstacles, such as a feedback unit, can likewise be arranged in the shoe 20, or can also be worn by the person on the body, independently of the aid, or be carried in another manner.

So as to pick up the map of an obstacle-free area surrounding the image acquisition unit 1, initially at least one image of a portion of the room is created by way of the image acquisition unit 1. There is also the option of creating multiple images, and to combine these into a single digital image D, and in particular also to select one from several different images, and to create the digital image D based on this image. Likewise, the digital image D can be created from one or more images as a result of different intermediate processing steps, such as in particular filtering, focusing, color corrections and the like. As an alternative, these steps can also be carried out in the processing unit 4 described below.

The digital image D thus created is forwarded by the image acquisition unit 1 to the processing unit 4, and is examined by the processing unit 4 for the presence of possible boundaries B of the obstacle-free area. This boundary B of the obstacle-free area found in the digital image D corresponds to the wall edge 11 in the room shown in FIG. 1.

So as to check whether a boundary B of an obstacle-free area is present in the digital image D, the processing unit 4 ascertains a respective boundary indicator value BI for individual pixels P, and in particular for all pixels, of the digital image D. For this purpose, a respective environment around each pixel P, within which the boundary indicator value BI is ascertained for the particular pixel P, is established for the pixel-wise predefined image data of the digital image D. The boundary indicator value B1 indicates the probability with which the map of the boundary B of an obstacle-free area is located within a predefined pixel environment.

So as to determine the regions in which a boundary B delimiting the walkable area is located, a neural network is used to ascertain the boundary indicator value BI in the shown exemplary embodiment. The neural network calculates the boundary indicator value BI in a pixel-wise manner, and in particular in the same manner for all pixels. The neural network is provided with the individual brightness or color values within an environment around the particular pixel P as input values. The environment around the particular pixel P can advantageously have a square shape, having an edge length of 200 pixels each, in the center of which the particular pixel P is located. In connection with the invention, it is also possible, of course, to use other environments as input values for the neural network.

Initially, the neural network calculates a probability distribution map, which encompasses one boundary indicator value BI for each pixel P. The size of the probability distribution map essentially corresponds to the size of the digital image, in particular except for the edge regions. The boundary indicator value BI indicates a probability as to whether the sought boundary B of the obstacle-free area is mapped in the particular pixel P.

So as to create the neural network, a plurality of predefined training images are used during a training phase, wherein a respective training bounding curve is predefined for each of the training images, and the neural network is trained to supply a boundary indicator value BI, which deviates from the boundary indicator values BI ascertained in the remaining image area, for the particular training image in the image points located in the area of the training bounding curve.

To create the neural network so as to supply reliable boundary indicator values BI and identify boundaries B of the obstacle-free area as effectively as possible, training images are used, which encompass digital images D of environments 10 indoor and outdoor in which different types of the boundary B of an obstacle-free area are represented. The represented boundaries B can be steps, curbstones, walls or other boundaries B, for example.

Digital images D of environments 10 outdoor under different weather conditions are also used to train the neural network. So as to increase the effectiveness of the training of the neural network, additionally image transformations, such as rotation, horizontal mirroring, contrast change, brightness change and softening, are used.

Figure 2:
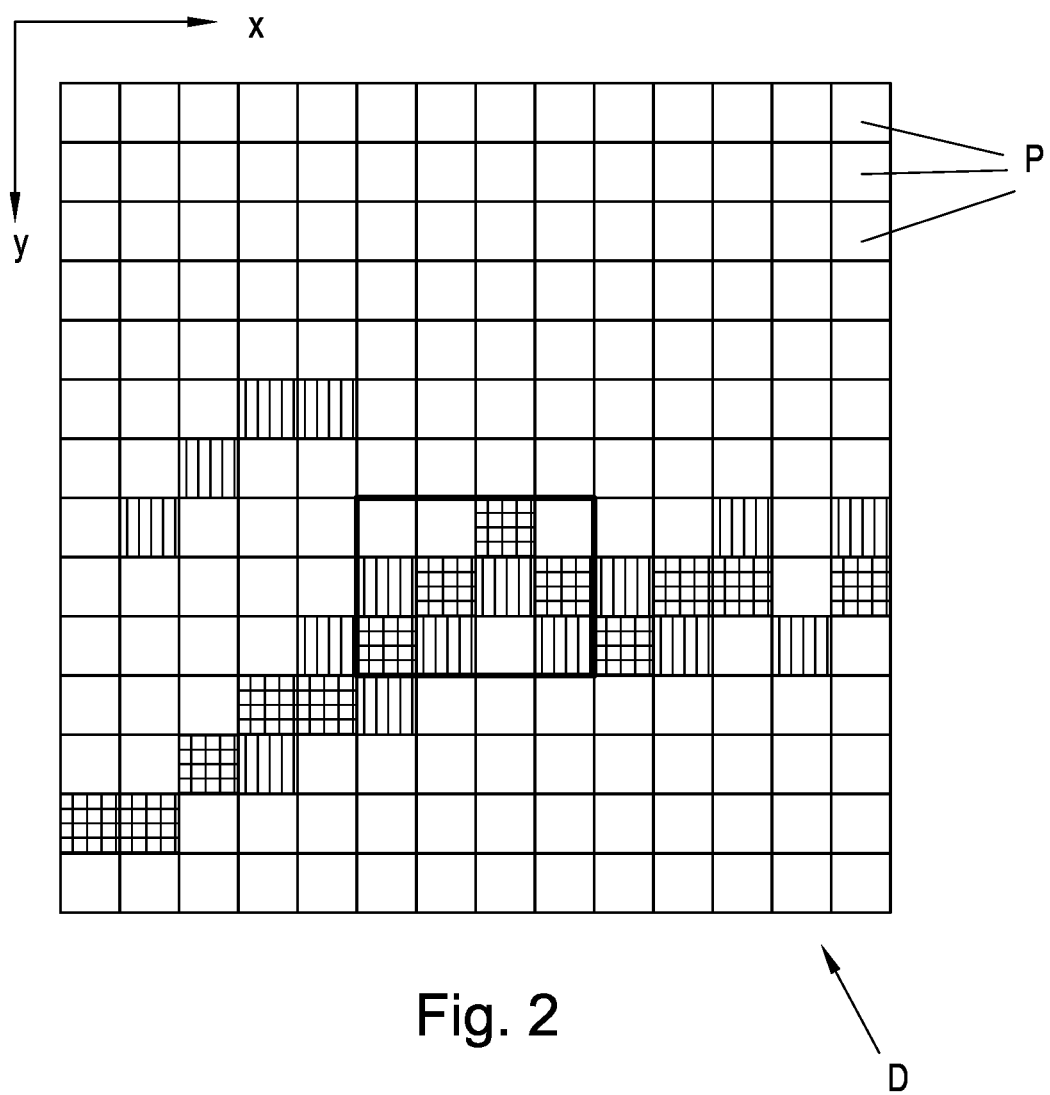
FIG. 2 shows a distribution of the boundary indicator values in a map of the environment.

FIG. 2 shows a schematic exemplary illustration having a considerably reduced pixel count for boundary indicator values BI ascertained by the neural network for the respective environment around pixels P of a section of a representation of the room shown in FIG. 1. White areas correspond to pixels P for which a low boundary indicator value BI was ascertained, that is, these have a low probability of containing the map of a boundary of the obstacle-free area. Longitudinally hatched areas correspond to pixels P for which a higher boundary indicator value BI was ascertained, so that these pixels P have a higher probability of containing the map of a boundary B. The highest boundary indicator value BI was ascertained in FIG. 2 for longitudinally and transversely hatched areas, so that these pixels P have the highest probability of representing a boundary B.

As a next method step, a coordinate parameterization having two parameters is predefined for the digital image, which corresponds in particular to the pixel coordinates, for example in the form of an x and a y coordinate. In the schematic section of the representation of the room shown in FIG. 2, the x coordinate indicates the column number and increases toward the right, proceeding from the left image edge, and the y coordinate indicates the line number and increases toward the bottom, proceeding from the top image.

However, this parameterization is not mandatory. As an alternative, for example, a different coordinate system may also be selected, in which, proceeding from an established camera point, lines having the same distance from the camera point are predefined in the form of contour lines in the digital image D.

In particular, it is also not mandatory in the case of this parameterization for the individual coordinate lines thus predefined to intersect directly in pixels P, that is, in image points for which boundary indicator values are directly available. Rather, it is also possible to predefine and use boundary indicator values BI created from nearby pixels P by way of interpolation for the image points predefined by the parameterization.

Subsequent to the ascertainment of the boundary indicator values BI, the processing unit 4 ascertains a bounding curve BK of the obstacle-free area, in particular in the form of a polygonal chain, as a curve. The bounding curve BK is selected in such a way that the image points that, compared to image points in the environment thereof, have a high boundary indicator value BI, are located on this curve. This means that the bounding curve BK is not necessarily selected so as to extend through individual pixels P, but can also be selected so as to extend through image points interpolated between multiple pixels P.

The map of the obstacle-free area that the person can safely walk on is thus established by the bounding curve BK and, if necessary, by further previously predefined curves or straight lines, in particular the bounding edges of the digital image D. In the shown exemplary embodiment, for the ascertainment of the bounding curve BK, the polygonal chain is selected so as to extend through a number of pixels P of the digital image D. For this, a respective image point, in particular a pixel P, through which the polygonal chain extends is selected for a number of predefined first parameters, and in particular for each image column of the digital image D or for a number of image columns having a respective predefined x coordinate.

As is apparent in FIG. 2, it is also possible that an identically high boundary indicator value is ascertained for two or more pixels P, for example having the same x coordinate. In FIG. 2, this is the case, for example, as a result of the window edge 12 also represented in the representation of the room in the upper left region of the probability distribution map.

So as to reduce such potential ambiguities in the probability distribution map estimated by the neural network and locate the most probable boundary of the obstacle-free area, an optimization method is applied by the processing unit 4 in the shown exemplary embodiment. So as to ascertain the bounding curve BK, a respective measure value to be optimized is ascertained for individual image points on the respective bounding curve BK, in particular for a plurality of image points, each having predefined first parameters or x coordinates, for individual bounding curves BK being considered. The measure value is composed of the following partial measure values:

the boundary indicator value BI; and
the value of the second parameter, in particular of the y coordinate, or a value derived therefrom; and/or
the difference between the second parameter in the particular point and the second parameter in a neighboring point located on the same bounding curve BK, the first parameter of which deviates by a predefined value, and which in particular is located in a neighboring column of the digital image D, or a value derived from this difference.

Since large jumps in the bounding curve BK between two neighboring columns are usually attributable to uncertainties in the probability distribution map, it is possible to establish which possible bounding curve BK is to be preferred, for example, by establishing transition probabilities between neighboring columns. Such transition probabilities can be used to select to what degree the resulting bounding curve BK is to be solid and/or to what extend jumps are permitted.

As an alternative, it is possible, for example, for obstacles located closer to the person or located directly in front of the person to be given a higher rating than those located further away from the person and in the background. As an alternative, possible boundaries B that are located in the bottom area of the digital image D, or also a solid boundary B without jumps, may be given preference.

So as to specifically determine an optimal bounding curve BK with respect to the above-mentioned criteria, the Viterbi algorithm can be employed, for example, which is described, for example, in Viterbi, A., *Error bounds for convolutional codes and an asymptotically Optimum decoding algorithm*. In: *IEEE Transactions an Information Theory*. Volume 13, No. 2, 1967, pp. 260-269.

The potential Φ, to be maximized by the Viterbi algorithm, for ascertaining the course of the bounding curve BK in the digital image is composed as follows:

the output of the neural network $\phi_n(x_i,y_i)$, that is, the ascertained boundary indicator values BI or the probabilities that a pixel P includes a boundary B of an obstacle-free area, weighted with a weighting factor $\omega_n$;

a value dependent on the height of the pixel P in the digital image D $\phi_h(x_i,y_i)$, for example by way of the y coordinate thereof or a value derived therefrom. This value is weighted with a weighting factor $\omega_h$.

a value dependent on the neighboring relationships of the individual points on the bounding curve $\phi_b(x_i,y_i,x_{i+1},y_{i+1})$, weighted with a weighting factor $\omega_b$.

In this, $x_i$ and $y_i$ denote the x coordinate and the y coordinate, respectively, of the i-th point $P_i$ on the bounding curve BK. A bounding curve having the points $P_i$ or coordinates $x_i$, $y_i$ is sought, for which the following sum term Φ for a bounding curve is maximal:

$$\Phi = \Sigma \omega_n \phi_n(x_i,y_i) + \Sigma \omega_h \phi_h(x_i,y_i) + \Sigma \omega_b \phi_b(x_i,y_i,x_{i+1},y_{i+1})$$

Figure 2A:
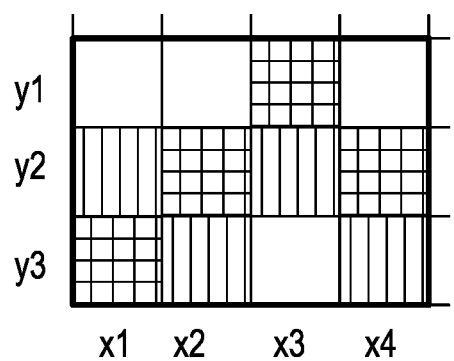
FIG. 2*a* shows a section of pixels from FIG. 2.

A possible implementation of the ascertainment of the course of the bounding curve BK by way of the Viterbi algorithm is described hereafter in a drastically simplified example based on the pixels identified in FIG. 2 and illustrated in enlarged form in FIG. 2a. The Viterbi algorithm is typically applied to the entire image to determine the bounding curve BK.

The shown drastically simplified example (FIG. 2a) contains a section of the digital image D including columns x=1 . . . 4, and lines y=1 . . . 3, of pixels, wherein the number of columns increases when counting to the left, and the number of lines increases when counting downward. The boundary indicator values BI ascertained by the neural network are summarized in tabular form in Table 1 for the marked pixels.

TABLE 1

Ascertained boundary indicator values BI of the selected pixels.

|       | x = 1 | x = 2 | x = 3 | x = 4 |
|-------|-------|-------|-------|-------|
| y = 1 | 1.0   | 1.0   | 3.0   | 1.0   |
| y = 2 | 2.0   | 3.0   | 2.0   | 3.0   |
| y = 3 | 3.0   | 2.0   | 1.0   | 2.0   |

For the ascertainment of the course of the bounding curve BK based on complete digital images D, the number of the columns and lines may be in a range of 1000 to 5000. In the shown example, the weighting factors or functions listed in Table 2 are predefined:

TABLE 2

Weighting factors and functions used in the example.

| | |
|---|---|
| $\omega_n$ | 1.0 |
| $\omega_n(x_i, y_i) = \Phi_n(P_i)$ | $BI(x_i, y_i) = BI(P_i)$ |
| $\omega_h$ | 0.25 |
| $\omega_h(x_i, y_i) = \Phi_h(P_i)$ | $y(P_i) = y_i$ |
| $\omega_b$ | −0.5 |
| $\omega_b(x_i, y_i, x_{i+1}, y_{i+1}) = \Phi_b(P_i, P'_{i+1})$ | $\|y_{i+1} - y_i\| = \|y(P'_{i+1}) - y(P_i)\|$ |

So as to ascertain the course of the bounding curve BK, initially the following calculations are carried out pixel-wise for the column x=1, which are shown for the pixel in line y=1. The boundary indicator value BI=1.0 multiplied by the predefined weighting factor $\omega_n$=1.0 and the height y($P_1$) =$y_i$=1 multiplied by the weighting factor $\omega_h$=0.25 for the height are added, yielding a result of 1.25. This calculation is subsequently carried out in the same manner for all pixels P of the column $x_i$=1. The calculated results for the column x=1 are shown in FIG. 5.

For the remaining columns, the following procedure is selected pixel-wise for all pixels P, which is shown in greater detail by way of example for the pixel in line y=1 of column x=2, and the determination is carried out analogously for the remaining pixels or columns.

Figure 5:
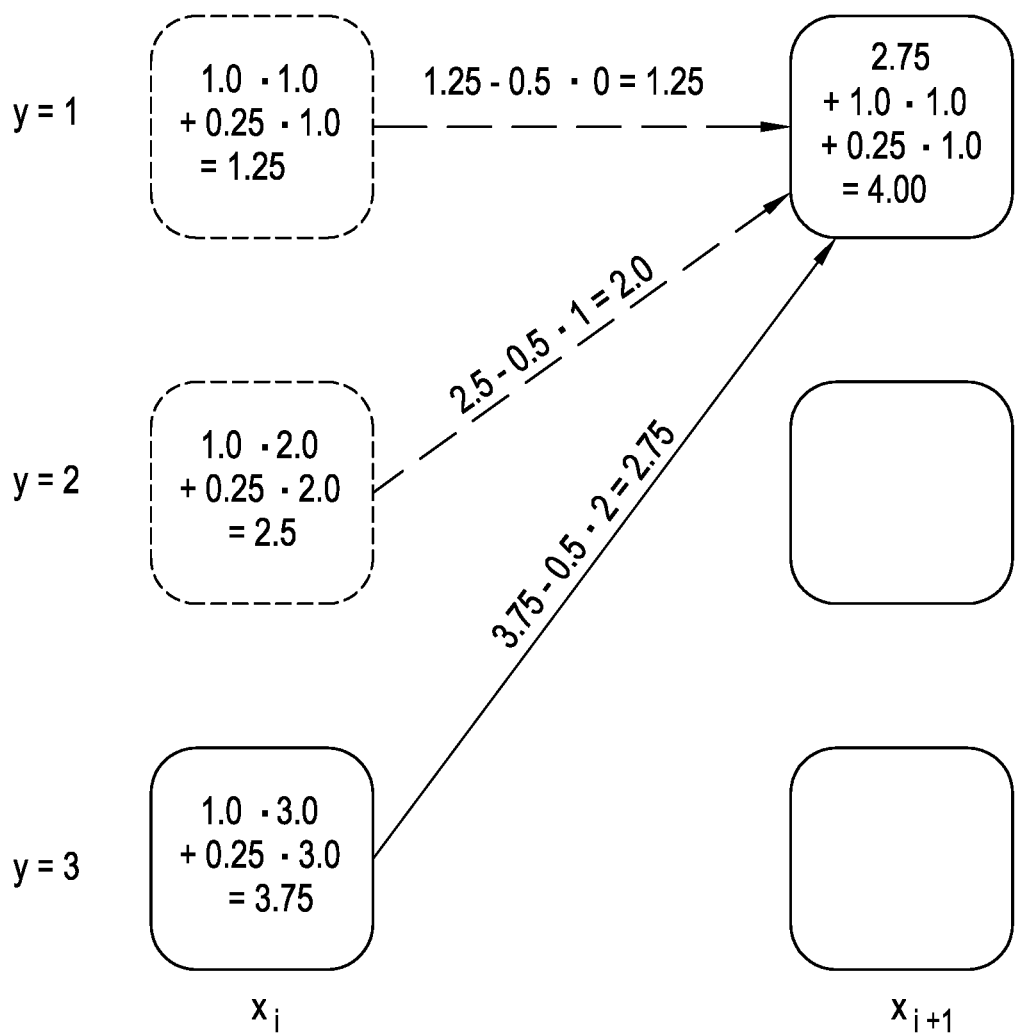
FIG. 5 shows the column-wise calculation of potentials by way of the Viterbi algorithm for the example in FIG. 2*a*.

Among all pixels of the respective preceding column $x_i$=1, the absolute amount of the difference of the y coordinate values of the respective pixels |y($P_{i+1}$)−y($P_i$)|, weighted by the weighting factor for the neighborhood $\omega_b$=−0.5, is added in each case to the ascertained potential (FIG. 5). Among these pixel-wise calculated values, the maximum value is ascertained in each case from the respective column. For example, the maximum value is yielded for the pixel at the position $x_{i+1}$=2, y=1, taking the pixel at the position $x_i$=1, y=3 into consideration.

The boundary indicator value B1 for the particular pixel and the height, in each case with the associated weightings, are added to the ascertained maximum value, as was shown already with respect to the pixels of the first line, to form the potential value for the particular pixel: The potential value $\Phi$ for the pixel at the position $x_{i+1}$=2, y=1 results as:

$$\Phi(P_{i+1}) = \max_i\{\Phi(P_i) + w_b|y(P_{i+1}) - y(P_i)|\} + w_h y(P_{i+1}) + w_n \Phi_n(P_{i+1})$$

Instead of the y coordinate value y($P_{i+1}$), it is also possible to use a value derived therefrom to determine the potential, for example the result f(y($P_{i+1}$)) of the evaluation of a function of the y coordinate value y($P_{i+1}$).

Figure 6:
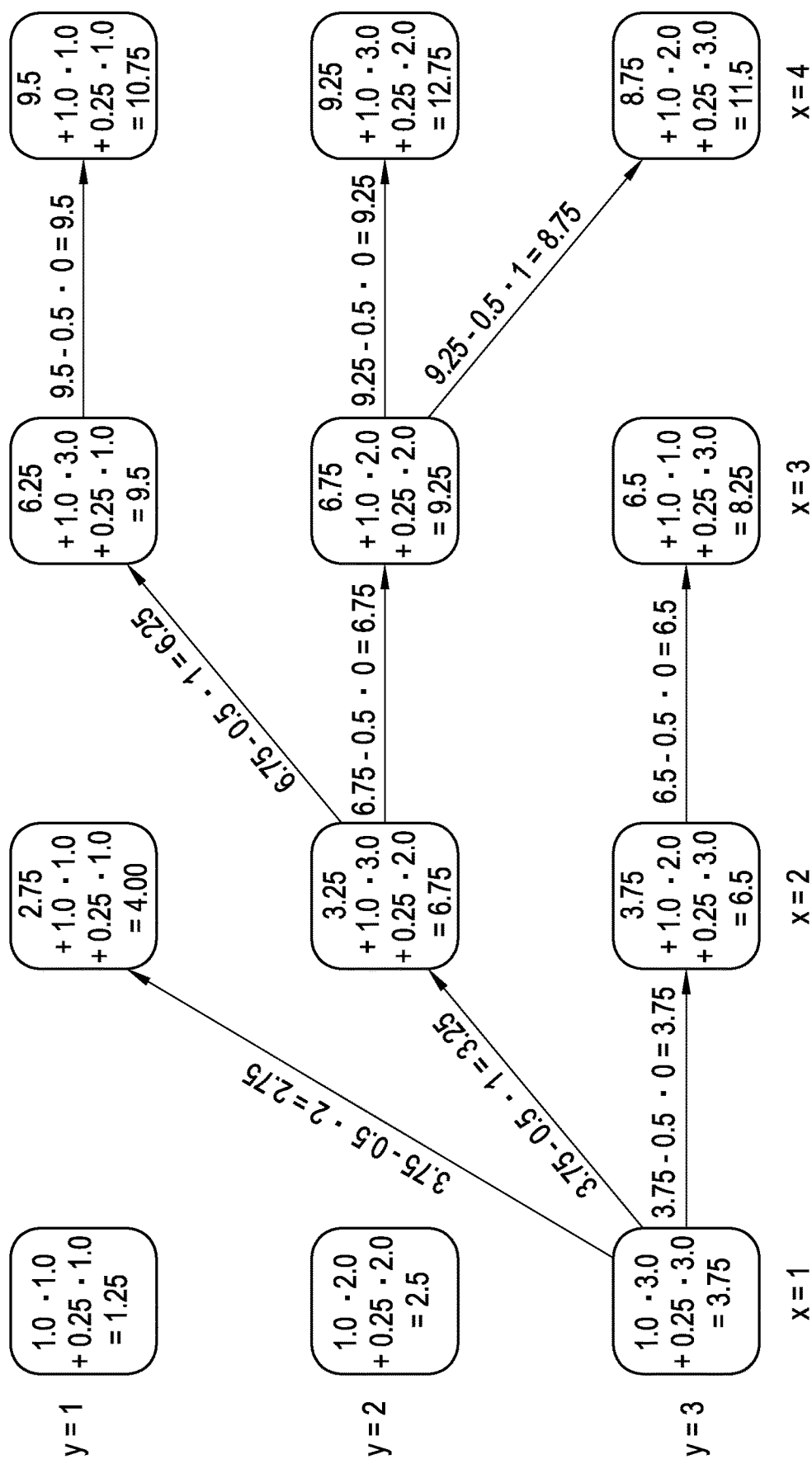
FIG. 6 shows the calculated potentials for the example in FIG. 2*a*.

FIG. 6 shows the individual computed potential values. Likewise, those pixels whose values are used for the determination of the potentials in the respective subsequent pixels are shown linked to these by arrows, for example, the potential value of the pixel at the position x=1, y=3 is used for determining the potential value of the pixel at the position x=2, y=2.

The pixel having the highest potential is sought in the last column. Proceeding from this pixel, the search now takes place backwards, that is, according to decreasing column number, for the pixel that was used in the calculation of the pixel of the potential.

Figure 7:
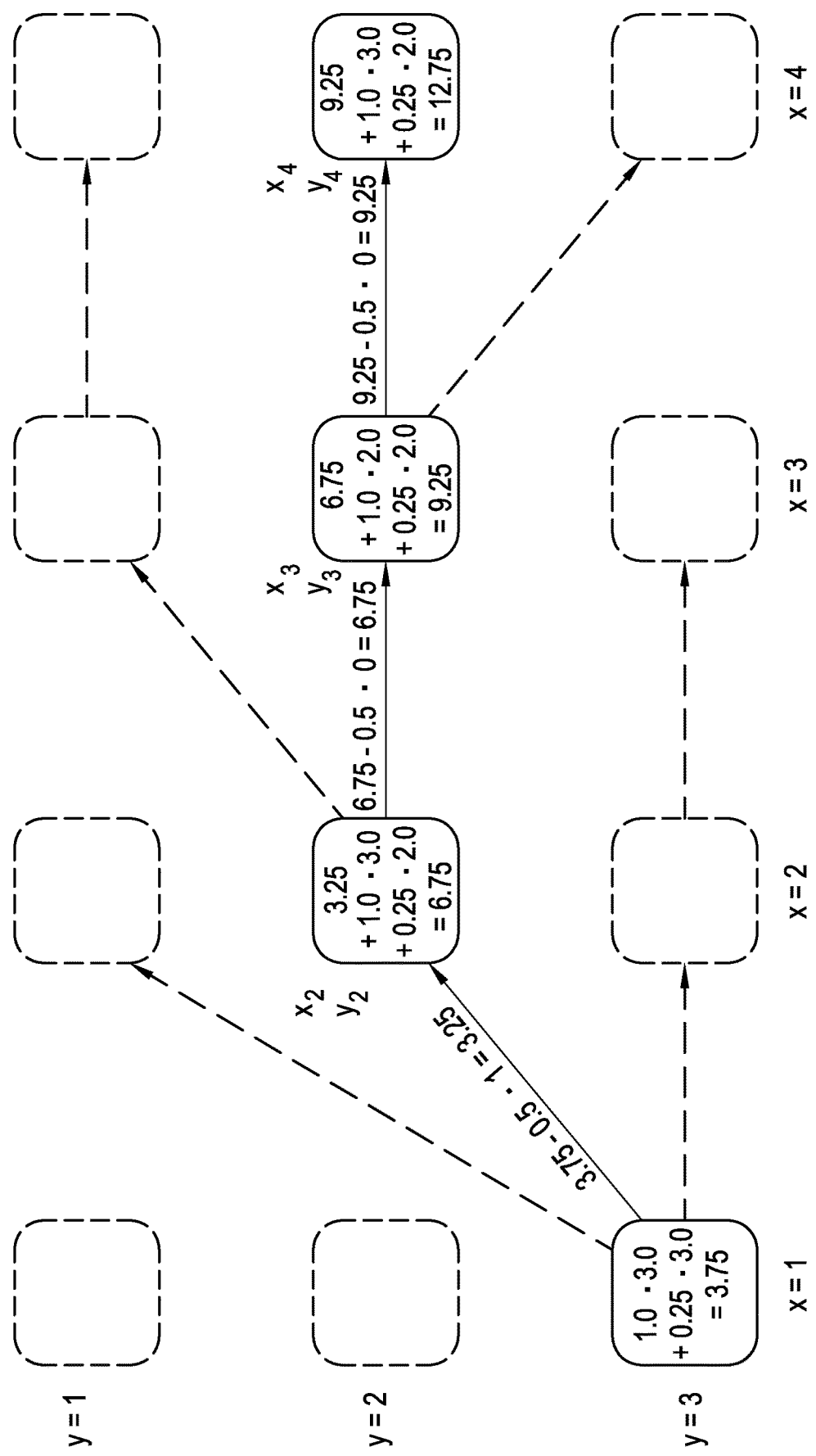
FIG. 7 shows the ascertained course of the bounding curve.

In FIG. 7, the highest potential was found in the pixel at the position x=4, y=2. The pixel at the position x=3, y=2 was used for the determination of this pixel, since this has the greatest potential share (9.25) among the pixels in the third column (x=3). Proceeding from this pixel, the pixel in the second column (x=2) is now sought, which was used in the calculation of the potential of this pixel. This is the pixel at the position x=2, y=2. Finally, proceeding from this pixel, the pixel in the first column (x=1) sought, which was used in the calculation of the potential of this pixel. This is the pixel at the position x=1, y=3.

The pixels thus ascertained are used to establish the course of the bounding curve BK within the scope of the Viterbi algorithm.

Additional specifications taken into consideration in the ascertainment of the course of the curve in the shown example are that the bounding curve BK is not to have any abrupt jumps and is to extend at a low height in the digital image D, that is, at high y coordinates.

So as to calculate a value that is derived from the y coordinate information for the determination the potential of the proximity, it is possible, for example, to use functions, in which minor deviations are neglected, so that, for example, differences in the absolute amount that are smaller than a predefined threshold value, such as 5, are neglected. In this way, it is also possible to achieve that the ascertained boundary indicator curve BK does not have any sudden changes or jumps. Moreover, it is also possible to provide different or further specifications for the establishment of the course of the curve.

Figure 3:
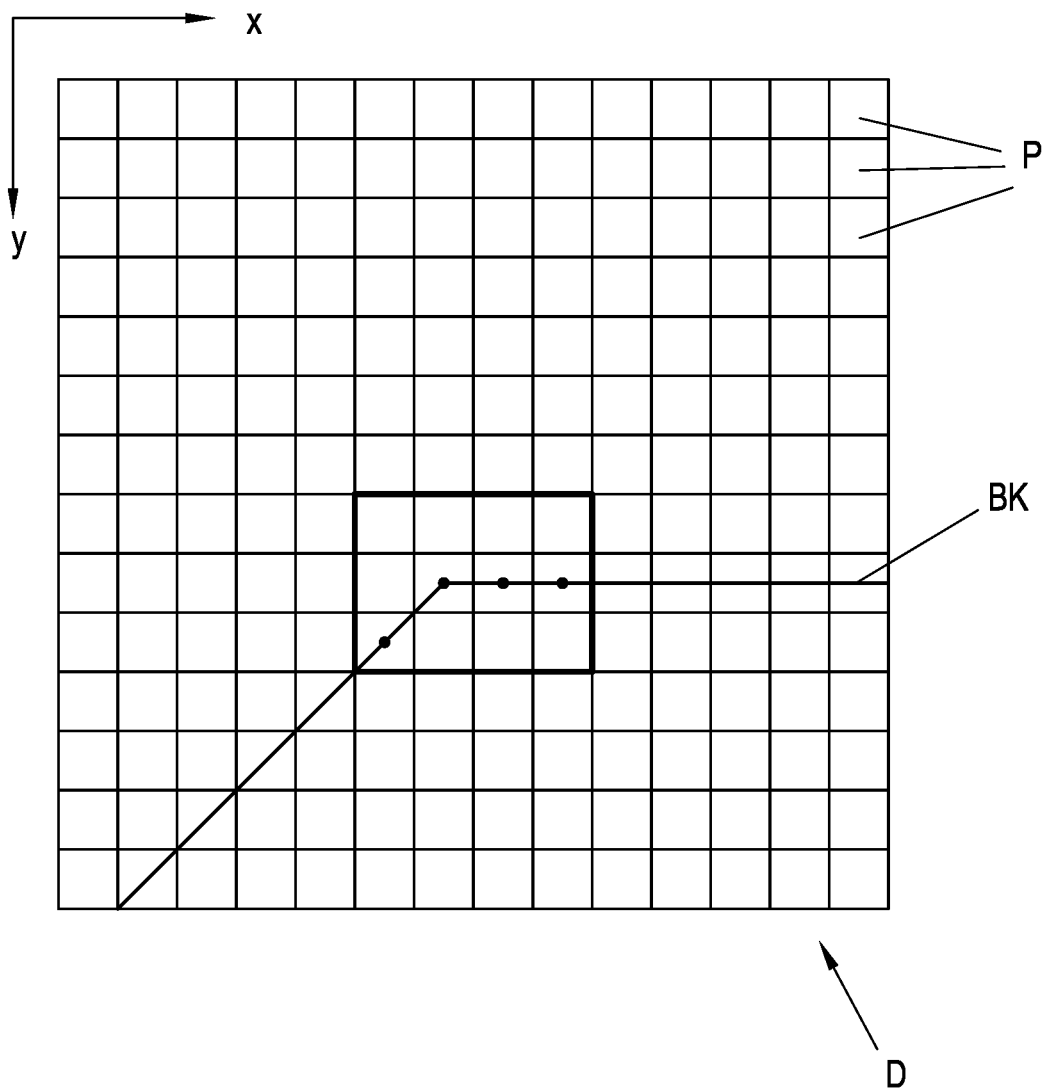
FIG. 3 schematically shows the ascertained bounding curve in a map of the environment.

FIG. 3 schematically shows the result of the application of such an optimization method for the ascertainment of the bounding curve BK, proceeding from the boundary indicator values BI ascertained by the neural network for the pixels P of the section of the representation of the environment 10 or the room represented in FIG. 2. In the ascertainment of the bounding curve BK shown in FIG. 3, the polygonal chain was selected so as to extend through a number of pixels P of the digital image D.

Using the above-described optimization method, a respective image point, in particular a pixel P, was selected for each image column of the digital image D having a respective predefined x coordinate, which is located far at the bottom in the map so as to allow the polygonal chain to extend through. In this way, the bottom window edge 12 that in FIG. 2 was still partially provided with boundary indicator values BI by the neural network may effectively be eliminated as a boundary B of an obstacle-free area.

This procedure is likewise particularly advantageous, for example, when the user of the invention utilizes this when climbing stairs, since in this case it is always the step located closest to the user that is identified first, so that the user is effectively guided from one step to the next.

After, initially, the boundary B of the obstacle-free area was ascertained, thereafter the actual size and shape of the represented obstacle-free area within the environment 10 of the image acquisition unit 1 is ascertained by the processing unit 4, so as to establish for the user of the method in which area he or she can move safely, without coming across obstacles. In the created digital image D, the size of the represented obstacle-free area corresponds to the freely walkable space extending between the image acquisition unit 1 and the wall edge 11 in FIG. 1.

So as to ascertain the shape and size of the obstacle-free area, the position of the obstacle-free area in the digital image D, the relative position, in particular the height and the orientation, of the image acquisition unit 1 with respect to the environment 10, and, if necessary, parameters of the image acquisition unit 1, in particular the resolution and the focal length, are used. So as to ascertain the shape and size of the obstacle-free area, it is furthermore assumed that the obstacle-free area picked up in the digital image D is located on a predefined three-dimensional surface, in particular on a plane.

In the exemplary embodiment, the position and the orientation of the image acquisition unit 1 are advantageously monitored, so that the image acquisition unit 1 only creates images or carries out method steps according to the invention when the image acquisition unit 1 is in a predefined position. A predefined position may, for example, be defined as a position in which both the orientation of the horizontal image axis of the image acquisition unit 1 and the viewing direction of the image acquisition unit 1 are oriented approximately horizontally, in particular at an angular deviation of no more than 30° about a horizontal axis, or a position in which the shoe 20 containing the image acquisition unit 1 is placed completely on the ground.

In the exemplary embodiment, the height of the image acquisition unit 1 mounted in the shoe 20 above the ground is additionally ascertained, which the image acquisition unit 1 assumes when the shoe 20 is on the ground. For example, the actual size and shape of the represented obstacle-free area are only determined in the process under the prerequisite that the image acquisition unit 1 is located at the ascertained height. In this way, the height can be utilized as another criterion for an energy-saving, efficient sequence of the method.

When the person wearing the shoe 20 comprising the incorporated image acquisition unit 1 rests on a lying surface, for example, the feet of the person, and consequently his or her shoes, are no longer in a position where these are placed on the ground, and the viewing direction of the image acquisition unit 1 is rotated compared to the predefined position. In this case, it is not necessary to create digital images D since the person is not trying to move, and the image acquisition unit 1 does not need to be supplied with energy from the energy store 3.

When the shoe 20 comprising the image acquisition unit 1 mounted therein is not in contact with the ground, for example, and is thus also not located at the ascertained height, advantageously no digital images D are thus created by the image acquisition unit 1. This is the case, for example, when the person wearing the shoe 20 raises the foot while walking, or when the person is resting and putting up his or her feet.

In this way, it can be ensured that the image acquisition unit 1 does not permanently consume power for the creation of digital images D, but only when the image acquisition unit 1 is in a position in which it is intended that the method according to the invention be carried out, that is, that the person wearing the shoe 20 indeed requires assistance with moving. In this case, it is also ensured at the same time that the size or the shape of the obstacle-free area, or the distance from potential obstacles, can be reliably ascertained.

As an improvement of the shown exemplary embodiment, it possible, in addition to ascertaining the size and the shape of the obstacle-free area, for the image acquisition unit 1 to ascertain a first distance A1 of the bounding curve BK, or of at least one point on the bounding curve BK, of the obstacle-free area. From the known position of the image acquisition unit 1, and assuming that the person wearing the shoe 20 comprising the integrated image acquisition unit 1 is located on a plane, it is then possible to determine the distance from an obstacle using the two-dimensional image showing the digital image D acquired by the image acquisition unit 1.

In addition to the acquisition of the digital image D and the evaluation with respect to the first distance A1, a second distance A2 is determined by distance measurement using ultrasound. In the exemplary embodiment of FIG. 1, an ultrasonic sensor 2 used for this purpose is arranged in the shoe 20 in the region of the tip of the shoe, next to the image acquisition unit 1, and is oriented in the same direction as the image acquisition unit 1, so that the acquisition area of the image acquisition unit 1 partially overlaps with the detection area of the ultrasonic sensor 2.

Thereafter, the first distance A1 and the second distance A2 of the obstacle-free area are compared to one another, and a further distance measurement value A is created, using the first distance A1 and the second distance A2. In the event of deviations between the first distance A1 and the second distance A2, the lower distance is preferably regarded as the further distance measurement value. In FIG. 1, distance lines thus ascertained are plotted at ascertained distances of 10 cm, 50 cm, 100 cm and 150 cm from the image acquisition unit 1.

This procedure is particularly advantageous since, for example, obstacles made of glass, such as glass doors or floor-length glass windows or transparent partitions, may be picked up only inadequately by an image acquisition unit 1 in some circumstances, so that these are not properly identified in the ascertainment of the bounding curve BK by way of the neural network NN. In this case, however, the ultrasonic sensor 2 correctly ascertains the distance from the obstacle made of glass. The fact that the lower of the two distances A1, A2 ascertained by way of different methods is accepted as the further distance measurement value A offers added safety for the person using the invention when moving, since the risk of hitting an obstacle is reduced by this distance selection.

It can furthermore be provided in all embodiments of the invention that an obstacle indicator HI is also ascertained, in addition to the boundary indicator value BI. The obstacle indicator value HI indicates the type of obstacle delimiting the obstacle-free area. The processing unit 4 or the neural network NN is designed to ascertain the respective obstacle indicator HI for individual image points on the bounding curve BK, and to preferably display this to the person. In this way, it can be communicated to the person wearing the shoe 20 which obstacles or objects, such as curbstones, walls, people, animals or the like, are present in the direction of movement, so that the person is given the option of responding accordingly.

As an alternative or in addition, it may be provided in all embodiments of the invention that the at least one image is acquired by way of an image acquisition unit 1 that is fixedly mounted on a person or on an animal, and in particular arranged in a glove, a belt, a helmet, a walking cane or a walking aid. In this way, it is possible, for example, that the image acquisition unit 1 is installed in crutches for frail persons who depend on walking aids, such as crutches or canes.

As an alternative, for example, it is also possible to equip shoes 20 or collars of service dogs with such an image acquisition unit 1, so that persons who are visually impaired and have limited motor skills are able to move particularly safely in an environment unknown to them, since they receive assistance from their service dog and, additionally, information and warnings ascertained according to the invention.

In all embodiments of the invention, the ascertained results, such as the shape and size of an obstacle-free area around the image acquisition unit 1, or the distance between the image acquisition unit 1 and obstacles potentially present in the direction of movement, are noticeably displayed for the user of the invention. The processing unit 4 is designed to forward the ascertained results to a feedback unit, for example.

The user can wear the feedback unit on the body, for example, so that the ascertained results can be transmitted to him or her in a form noticeable to him or her. If the user of the invention is a visually impaired person, for example, the feedback unit can be a headset, for example, which the person wears on the head.

The processing unit 4 is designed to transmit the ascertained results regarding the shape and size of the walkable obstacle-free area to the feedback unit, and to activate the feedback unit in such a way that, for example, as the distance from the boundary B of the obstacle-free area decrease, sequences of tones becoming louder or higher, for example, are output at an increasingly faster rhythm, so that it is recognizable for the person that he or she is approaching an obstacle.

It may also be provided, for example, that tones are only applied to the left or the right ear, or to both ears of the person, as a function of the direction in which an obstacle is located in relation to the person, that is, to the left or right of the person or directly ahead of the person, so as to alert the person to the position of the obstacle.

Figure 4:
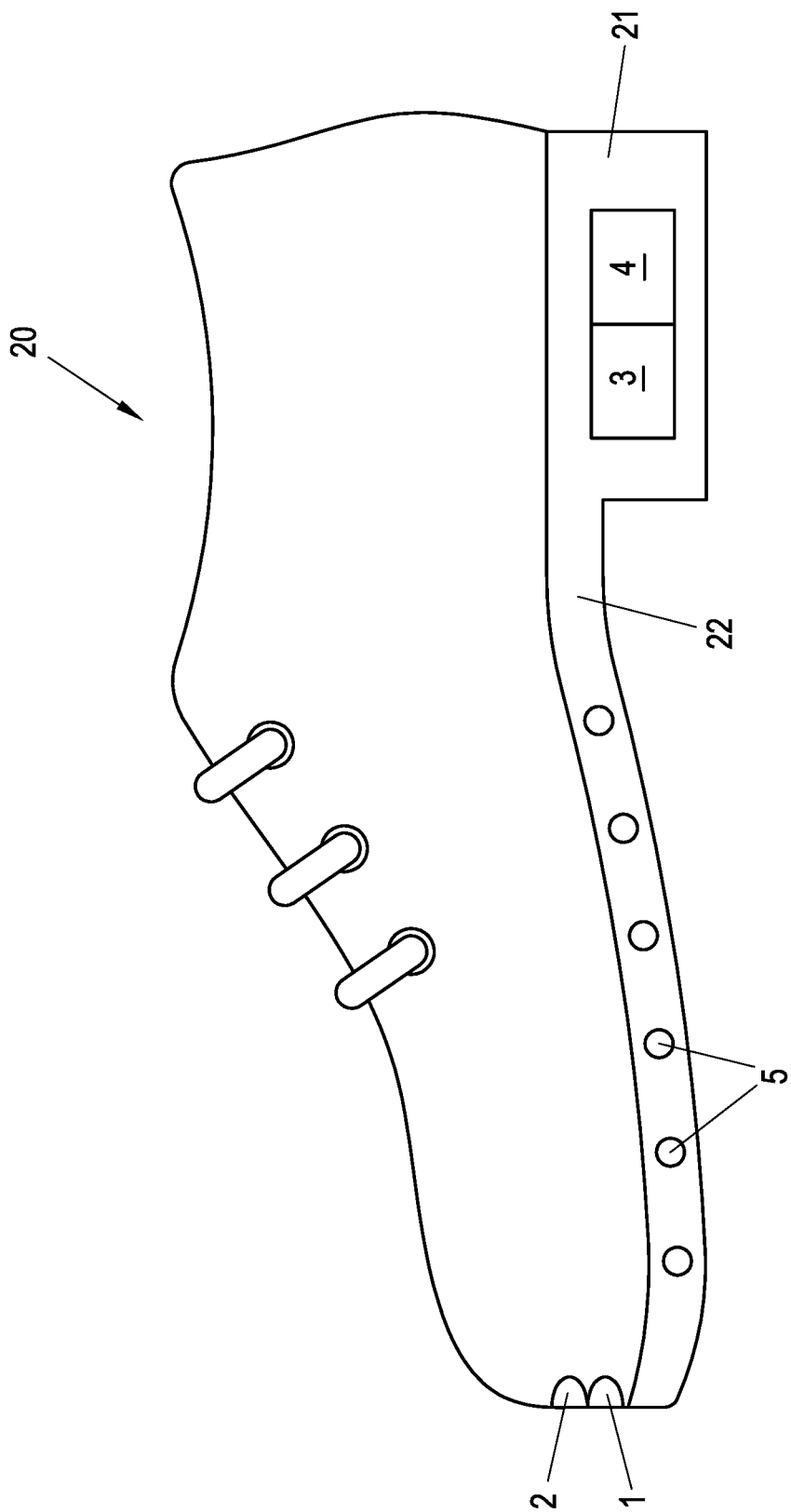
FIG. 4 shows a shoe comprising actuator elements.

FIG. 4 shows a shoe 20 comprising an image acquisition unit 1 mounted therein, an ultrasonic sensor 2, an energy store 3, a processing unit 4, and actuator elements 5. The image acquisition unit 1 and the ultrasonic sensor 2 are installed in the tip of the shoe, so that both are oriented in the same direction. In the exemplary embodiment, the energy store 3 and the processing unit 4 are arranged in the heel 21 of the shoe 20. Six actuator elements 5 are arranged in the region of the toes or the ball of the foot of the wearer of the shoe 20 in the shoe sole region 22, wherein the actuator elements 5 are arranged so as to form a line extending from the ball in the direction of the tip of the foot. The actuator elements 5 are designed as vibration elements in the exemplary embodiment, which vibrate, for example, when activated by the processing unit 4. For example, the actuator elements can also have a pin-shaped design and push upwardly into the foot upon activation.

Initially, the processing unit 4 ascertains a distance value corresponding to the size of an obstacle-free area around the image acquisition unit 1 arranged in the tip of the shoe, or around a person wearing the shoe 20. At least one digital image D created by the image acquisition unit 1 and/or the ultrasonic sensor 2 are used to ascertain the distance value.

So as to render the ascertained distance detectable for the person, at least one of several actuator elements 5 arranged sequentially in the direction of the more sensitive body region, in particular toward the tip of the foot, is activated in at least one body region in the shoe 20 of the person, as a function of the distance value. The actuator elements 5 are selected as a function of the distance value. As the distance value with respect to an obstacle decreases, actuator elements 5 in a more sensitive body region, in particular closer to the tip of the foot, are selected.

This means that, at a comparatively large distance from an obstacle, initially the actuator element 5 in the region of the ball of the foot of the person is activated. When the distance from the obstacle decreases, proceeding from the actuator element 5 in the region of the ball of the foot, the actuator element 5 located closer to the tip of the foot is activated until, ultimately, at a small distance from the obstacle, the actuator element in the region of the toes of the person is selected. This indicates to the person that he or she is at risk of hitting an obstacle if he or she were to continue to move in the present direction.

However, the invention can be used not only to make it easier for persons who are visually impaired and/or have limited motor skills to move in day-to-day life. As an alternative, the invention can also be used to detect an obstacle-free area around an image acquisition unit 1 arranged, for example, in the region of the bumper of a vehicle, and to ascertain the shape and size of the freely negotiable area in the driving direction of the vehicle. This can be of interest, for example, in the field of autonomous driving so as to ascertain the negotiable environment or to detect the distance from a preceding vehicle, and, for example, to regulate the speed of the autonomously driving vehicle as a function of the distance from the preceding vehicle.

The invention claimed is:

1. A method for forming a map of an obstacle-free area surrounding an image acquisition unit, which comprises the steps of:
    a) creating at least one image of a portion of an environment of the image acquisition unit by way of the image acquisition unit, and a digital image being created based on the at least one image;
    b) examining the digital image thus created for a presence of possible boundaries of the obstacle-free area, wherein a boundary indicator value is ascertained for individual pixels of the digital image, in dependence on a pixel-wise predefined image data of the digital image within an environment of a respective pixel, the boundary indicator value indicating a probability with which a map of a boundary of the obstacle-free area is disposed within a predefined pixel environment;
    c) predefining a coordinate parameterization having two parameters for the digital image;
    d) ascertaining a bounding curve of the obstacle-free area as a curve on which image points are disposed that, compared to image points in the environment thereof, have a high boundary indicator value; and
    e) establishing the map of the obstacle-free area by the bounding curve.

2. The method according to claim 1, which further comprises selecting a polygonal chain that extends through a number of the pixels of the digital image as the bounding curve, a respective image point, in particular a pixel, through which the polygonal chain extends being selected for a number of predefined first parameters, and in particular for each image column of the digital image or for a number of image columns having a respective predefined x coordinate.

3. The method according to claim 1, wherein for an ascertainment of the bounding curve, an optimization method is carried out in step d), in which, for individual bounding curves being considered, a respective measure value to be optimized is ascertained for individual image points on the respective bounding curve, each having predefined first parameters or x coordinates, the respective measure value being composed of the following partial measure values:
    the boundary indicator value; and
    a value of a second parameter or a value derived therefrom; and/or
    a difference between the second parameter in a particular point and the second parameter in a neighboring point located on a same bounding curve, the first parameter of which deviates by a predefined value, and which in particular is located in a neighboring column of the digital image, or a value derived from this difference.

4. The method according to claim 1, wherein for the ascertainment of the bounding curve, an optimization method is carried out in step d), in which, for individual bounding curves being considered, in each case the image points on a particular bounding curve each having predefined first parameters or x coordinates, are selected which:
    compared to other image points have preferably high boundary indicator values; and/or
    have preferably high values of the second parameter; and/or
    have the second parameter which approximately corresponds to a second parameter of a particular neighboring point on the bounding curve, or has only a small difference compared to the second parameter, in particular so that a bounding curve results from a position of the image points whose change in a direction of the second parameter, is small.

5. The method according to claim 1, which further comprises calculating the boundary indicator value in a pixel-wise manner by way of a neural network, the neural network receiving, as input values, individual brightness or color values within an environment around a respective pixel, the environment around the respective pixel being identically predefined for each pixel, in particular having a predefined relative position with respect to the respective pixel.

6. The method according to claim 5, wherein the neural network is created using a plurality of predefined training images, a respective training bounding curve being predefined for each of the predefined training images, and the neural network being trained to supply a boundary indicator value that deviates from the boundary indicator values ascertained in a remaining image area, for a particular training image in the image points located in an area of the training bounding curve.

7. The method according to claim 1, which further comprises ascertaining an actual size and a shape of a mapped obstacle-free area within the environment of the image acquisition unit, based on at least one of:
a position of the obstacle-free area in the digital image;
a relative position of the image acquisition unit compared to the environment;
parameters of the image acquisition unit; or
an assumption that the obstacle-free area acquired in the digital image is disposed on a predefined three-dimensional surface.

8. The method according to claim 1, which further comprises acquiring the at least one image by way of the image acquisition unit being fixedly mounted on a person or on an animal.

9. The method according to claim 8, wherein a position and an orientation of the image acquisition unit are monitored, and the image acquisition unit only creates images, or the steps b) to e) are only carried out,
when the image acquisition unit is in a predefined position in which both an orientation of a horizontal image axis of the image acquisition unit and a viewing direction of the image acquisition unit are oriented approximately horizontally, or
when a shoe containing the image acquisition unit is placed completely on a ground.

10. The method according to claim 8, wherein the digital images are recorded by way of the image acquisition unit mounted on a shoe, a height of the image acquisition unit above ground being ascertained when the shoe is on the ground, and an actual size and shape of a mapped obstacle-free area being determined under a prerequisite that the image acquisition unit is located at an ascertained height.

11. The method according to claim 8, wherein:
in step b), in addition to the boundary indicator value, an obstacle indicator is also ascertained, which indicates a type of obstacle bounding the obstacle-free area; and
the obstacle indicator is ascertained for individual image points on the bounding curve.

12. The method according to claim 1, which further comprises:
ascertaining a first distance of the bounding curve or of at least one point on the bounding curve of the obstacle-free area from the image acquisition unit;
determining a second distance by distance measurement using ultrasound, an ultrasonic sensor used for measuring the second distance being disposed in an area of the image acquisition unit and being oriented in a same direction as the image acquisition unit, or having a detection area partially overlapping with an acquisition area of the image acquisition unit; and
comparing the second distance and the first distance of the obstacle-free area to one another, and a further distance measurement value is created, using the first distance and the second distance, wherein, in an event of deviations between the first distance and the second distance, the lower distance of the first distance and the second distance is regarded as the further distance measurement value.

13. The method according to claim 1, wherein:
a distance value, corresponding to a size of the obstacle-free area, around a person is ascertained or predefined, and thereafter at least one of a plurality of actuator elements, which are disposed sequentially in a direction of a sensitive body region, is activated in at least one location of a body of the person, as a function of the distance value, the actuator elements being selected as a function of the distance value; and
an actuator element in the sensitive body region being selected based on a smaller the distance value.

14. A device for forming a map of an obstacle-free area surrounding an image acquisition unit, the device comprising:
said image acquisition unit;
a processor connected downstream of said image acquisition unit;
said image acquisition unit is configured to create at least one image of a portion of an environment of said image acquisition unit and to transmit the at least one image to said processor, said processor configured to:
create a digital image based on the at least one image, and to examine the digital image thus created for a presence of possible boundaries of the obstacle-free area;
ascertain a boundary indicator value for individual pixels of the digital image, as a function of pixel-wise predefined image data of the digital image within an environment of a particular pixel, said boundary indicator value indicating a probability with which a map of a boundary of the obstacle-free area is located within a predefined pixel environment;
predefine a coordinate parameterization having two parameters for the digital image;
ascertain a bounding curve of the obstacle-free area as a curve on which image points are located that, compared to image points in the environment thereof, have a high boundary indicator value; and
establish the map of the obstacle-free area by the bounding curve.

15. The device according to claim 14, wherein said processor is configured to:
select a polygonal chain as the bounding curve, the polygonal chain extending through a number of the pixels of the digital image; and
select a respective image point through which the polygonal chain extends for a number of predefined first parameters.

16. The device according to claim 14, wherein said processor is configured to carry out an optimization method for an ascertainment of the bounding curve, said processor configured to ascertain, for individual bounding curves being considered, a respective measure value to be optimized for individual image points on a respective bounding curve, each having predefined first parameters or x coordinates, wherein the respective measure value is composed of the following partial measure values:
the boundary indicator value; and
a value of a second parameter or a value derived therefrom; and/or
a difference between the second parameter in a particular point and the second parameter in a neighboring point located on a same bounding curve, a first parameter of which deviates by a predefined value, and is disposed in a neighboring column of the digital image, or a value derived from a difference.

17. The device according to claim 14, wherein said processor is configured to carry out an optimization method for an ascertainment of the bounding curve, said processor configured, for individual bounding curves being considered, to select in each case the image points on a particular bounding curve each having predefined first parameters or x coordinates, which:
compared to other image points have high boundary indicator values, and/or high values of the second parameter; and/or
have the second parameter which approximately corresponds to the second parameter of a particular neighboring point on the bounding curve, or has only a small difference compared to the second parameter, so that, in particular, the bounding curve results from a position of the image points whose change in a direction of the second parameter is small.

18. The device according to claim 14, wherein said processor is configured to:
calculate the boundary indicator value in a pixel-wise manner by way of a neural network; and
provide the neural network, as input values, with individual brightness or color values within an environment around a particular pixel.

19. The device according to claim 14, wherein said processor is configured to:
create a neural network using a plurality of predefined training images; and
predefine a respective training bounding curve for each of the predefined training images, and to train the neural network to supply a boundary indicator value that deviates from boundary indicator values ascertained in a remaining image area, for a particular training image in image points disposed in an area of the respective training bounding curve.

20. The device according to claim 14, wherein said processor is configured to ascertain an actual size and a shape of a mapped obstacle-free area within the environment of said image acquisition unit based on at least one of:
a position of the obstacle-free area in the digital image;
a relative position of said image acquisition unit compared to the environment;
parameters of the image acquisition unit; or
an assumption that the obstacle-free area acquired in the digital image is located on a predefined three-dimensional surface.

21. The device according to claim 14, wherein said image acquisition unit is fixedly mounted on a person or on an animal.

22. The device according to claim 21, wherein said processor is configured to monitor a position and an orientation of said image acquisition unit, said processor further configured to carry out further processing steps only when:
said image acquisition unit is in a predefined position in which both an orientation of a horizontal image axis of said image acquisition unit and a viewing direction of said image acquisition unit are oriented approximately horizontally; or
a shoe containing said image acquisition unit is placed completely on a ground; and/or
said image acquisition unit is configured to create images only when:
said image acquisition unit is in a predefined position in which both the orientation of the horizontal image axis of said image acquisition unit and the viewing direction of said image acquisition unit are oriented approximately horizontally; or
the shoe containing said image acquisition unit is placed completely on the ground.

23. The device according to claim 22, further comprising a shoe and said image acquisition unit is mounted in said shoe, said processor being configured to ascertain a height of said image acquisition unit above the ground when said shoe is on the ground, and to determine an actual size and shape of a mapped obstacle-free area under a prerequisite that said image acquisition unit is disposed at an ascertained height.

24. The device according to claim 14, wherein said processor is configured to:
ascertain, in addition to the boundary indicator value, an obstacle indicator, which indicates a type of obstacle bounding the obstacle-free area; and
ascertain the obstacle indicator for individual ones of the image points on the bounding curve.

25. A device according to claim 14,
further comprising an ultrasonic sensor disposed in an area of said image acquisition unit, said ultrasonic sensor is oriented in a same direction as said image acquisition unit or has a detection area partially overlapping with an acquisition area of said image acquisition unit;
wherein said processor is configured to:
ascertain a first distance of the bounding curve or of at least one point on the bounding curve of the obstacle-free area from said image acquisition unit;
determine a second distance by distance measurement by way of said ultrasonic sensor; and
compare the second distance and the first distance of the obstacle-free area to one another, and to create a further distance measurement value, using the first distance and the second distance; and
in an event of deviations between the first distance and the second distance, establish in each case a lower distance of the first distance and the second distance as the further distance measurement value.

26. The device according to claim 25, further comprising a feedback unit, said feedback unit being configured to communicate data to said processing unit and to display an ascertained distance measurement value and/or an ascertained obstacle indicator value and/or an actual size and shape of a mapped obstacle-free area to the person.

27. The device according to claim 14, further comprising a shoe containing a feedback unit having a plurality of actuator elements, said image acquisition unit and said processor, said shoe configured to:
ascertain or predefine a distance value, corresponding to a size of the obstacle-free area, around a person;
activate said feedback unit as a function of the distance value;

activate, in said shoe of the person, at least one of a plurality of said actuator elements which are disposed sequentially in a direction of a sensitive body region;

select said actuator elements as a function of the distance value, and to select an actuator element in said sensitive body region based on a smaller the distance value.

* * * * *